United States Patent Office 3,639,471
Patented Feb. 1, 1972

3,639,471
PROCESS FOR THE PREPARATION OF SULFEN-
YLATED CARBAMIC ACID FLUORIDES
Erich Klauke, Odenthal-Hahnenberg, and Engelbert
Kuhle, Bergedorf, Gladbach, Germany, assignors to
Farbenfabriken Bayer Aktiengesellschaft, Leverkusen,
Germany
No Drawing. Filed July 3, 1968, Ser. No. 742,176
Claims priority, application Germany, July 5, 1967,
F 52,861
Int. Cl. C07c 51/58, 101/10, 125/00
U.S. Cl. 260—544 C                           20 Claims

ABSTRACT OF THE DISCLOSURE

Reacting N-mono-(substituted- and unsubstituted-aliphatic, e.g. lower alkyl; -cycloaliphatic, e.g. $C_{5-6}$ cycloalkyl; and -aromatic, e.g. phenyl and halo-, nitro-, lower alkyl-, lower alkoxy-, lower alkylmercapto- and/or trifluoromethyl-phenyl)-substituted carbamic acid fluoride with (substituted- and unsubstituted-alkyl, e.g. haloalkyl; and -aryl, e.g. halo-, alkyl- and/or nitro-aryl, especially -phenyl)-sulfenic acid chloride or sulfur dichloride or disulfur dichloride, in the presence of a tertiary amine as acid binding agent, e.g. at a temperature of about 0–100° C., optionally in the presence of an inert organic solvent, using about one mol of the carbamic acid fluoride per mol of said sulfenic acid chloride or at least two mols per mol of the sulfur dichloride or disulfur dichloride, to form the corresponding aforesaid N-(substituted- and unsubstituted-aliphatic, -cycloaliphatic and -aromatic)-N-[(substituted- and unsubstituted-alkyl and -aryl)-sulfenyl]-carbamic acid fluoride and bis[(N-substituted- and unsubstituted-aliphatic, -cycloaliphatic or -aromatic]-N-fluorocarbonyl)-amino]-sulfide and -disulfide, which are particularly new compounds which possess arthropodicidal, e.g. insecticidal and acaricidal, as well as fungicidal properties, and which may be used as intermediates in organic synthesis.

The present invention relates to and has for its objects the provision for particular new methods of producing sulfenylated carbamic acid fluorides, and more particularly N-(lower alkyl, $C_{5-6}$ cycloalkyl, phenyl and halo- and lower alkyl-substituted phenyl)-N-[halolower alkyl and phenyl)-sulfenyl]-carbamic acid fluorides and bis-[(N-[lower alkyl, $C_{5-6}$ cycloalkyl, phenyl and halo- and lower alkyl - substituted phenyl]-N-fluorocarbonyl)-amino]-sulfides and -disulfides, which are particularly new compounds which possess arthropodicidal and fungicidal properties and which may be used as intermediates in organic synthesis, e.g. in a simple single step reaction, using readily available starting materials whereby to attain outstanding yields, with other and further objects of the invention becoming apparent from a study of the within specification and accompanying examples.

It is known that monosubstituted carbamic acid chlorides can be converted smoothly into isocyanates with acid-binding agents such as trimethyl amine [cf. Ann. 562, 78 (1949)]. The course of the reaction can be represented for example by the following formula scheme:

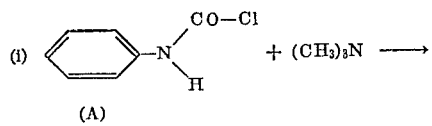

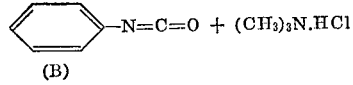

In this reaction (i), therefore, an intramolecular splitting off occurs of hydrogen chloride from the carbamic acid chloride molecule.

It has not hitherto been known, or successfully carried out, that in monosubstituted carbamic acid chlorides the hydrogen atom on the nitrogen atom can be reacted with acid chlorides, that is, that the hydrogen atom can be replaced by an acid radical. In this second case, an intermolecular, rather than an intramolecular, splitting off of hydrogen chloride would be necessary.

If monosubstituted carbamic acid chlorides are reacted with acid-binding agents, such as triethylamine, and sulfenic acid chlorides, such as trichloromethyl-sulfenyl chloride, there is also obtained the appropriate isocyanate, since the trichloromethyl-sulfenyl chloride does not react.

Thus, there occurs here again an intramolecular, instead of an intermolecular, splitting off of hydrogen chloride.

The second case reaction can be represented for example by the following formula scheme:

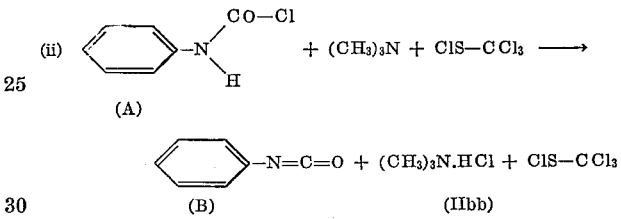

If monosubstituted carbamic acid fluorides are reacted with an acid-binding agent, such as trimethylamine, and a carboxylic acid chloride, such as acetic acid chloride, the appropriate isocyanate in this third case is again obtained. Here, too, there occurs merely an intramolecular splitting off of hydrogen fluoride, but no intermolecular splitting off of hydrogen chloride.

The course of this third case reaction can be represented for example by the following formula scheme:

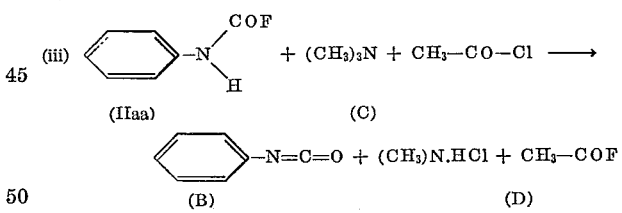

It has now been found, in accordance with the present invention, that sulfenylated carbamic acid fluorides, i.e. N-(lower alkyl, $C_{5-6}$ cycloalkyl, phenyl and halo- and lower alkyl- substituted phenyl)-N-[(halolower alkyl and phenyl)-sulfenyl]-carbamic acid fluorides and bis-[(N-[lower alkyl, $C_{5-6}$ cycloalkyl, phenyl and halo- and lower alkyl- substituted phenyl]-N-fluorocarbonyl)-amino]-sulfides and -disulfides, which are particularly new compounds which possess arthropodicidal, i.e. insecticidal and acaricidal, as well as fungicidal properties, and which may be used as intermediates in organic synthesis, having the formula

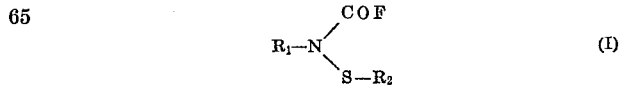

in which $R_1$ is selected from the group consisting of lower alkyl, cycloalkyl having 5–6 ring carbon atoms, phenyl, and substituted phenyl which is substituted with substituents selected from the group consisting of lower alkyl and 1–3 halo, and $R_2$ is selected from the group consisting of halo lower alkyl, phenyl, the radical

 (Ii)

and the radical

 (Iii)

in which the last-mentioned two $R_1$ symbols are the same as defined above, can be obtained simply, that is in a one-step reaction, in high purity and with outstanding yields, by the process which comprises reacting monosubstituted carbamic acid fluorides, i.e. N-mono-(lower alkyl, $C_{5-6}$ cycloalkyl, phenyl and halo- and lower alkyl-substituted phenyl)-substituted carbamic acid fluorides having the general formula

 (IIa)

in which $R_1$ is the same as defined above, with a member selected from the group consisting of sulfenic acid chlorides having the formula $$R_{2a}\text{—S—Cl} \qquad (IIb)$$

in which $R_{2a}$ is halo lower alkyl or phenyl, sulfur dichloride and disulfur dichloride, in the presence of a tertiary amine as acid-binding agent, for example at a temperature substantially between about 0–100° C. Thus, in the last-mentioned formula $R_{2a}$ actually contemplates not only halo lower alkyl and phenyl radicals corresponding to $R_2$ of Formula I but also a chloro or chlorothio (i.e. Cl—S—) group, whereupon in the latter two cases two mols of the mono-substituted carbamic acid fluoride should be used rather than one mol with the Cl—S—Cl or Cl—S—S—Cl reactant to obtain corresponding formula (I) compounds having the radicals

for $R_2$.

The reaction may optionally take place in the presence of an inert organic solvent or diluent.

Advantageously, as aforesaid, by means of the instant process the particular new carbamic acid fluorides of the present invention may be obtained in one step and with high yields.

It is very surprising that in accordance with the production process of the present invention the hydrogen atom on the nitrogen of the carbamic acid fluoride is replaced by the sulfenic acid radical, with an intermolecular splitting off of hydrogen chloride. It would certainly have been expected that an intramolecular splitting off of hydrogen fluoride would occur and thus that the appropriate isocyanate would be formed instead.

If for example N-phenylcarbamic acid fluoride and fluoro-dichloro-methyl-sulfenyl chloride are used, the typical reaction according to the present invention can be represented by the following formula scheme:

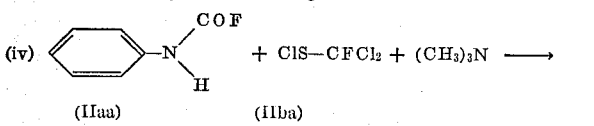

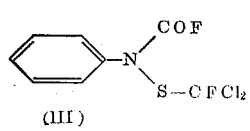

The starting materials are clearly characterized by the above-mentioned Formulae IIa and IIb and even typify the analogous use of sulfur dichloride and disulfur dichloride.

The carbamic acid fluorides (IIa) mentioned as starting materials are already known (compare Soc. 1945, 864). As examples, there may be mentioned: methyl, butyl, isopropyl, cyclohexyl, phenyl, 4-chlorophenyl, 3-methylphenyl, 3-nitro-phenyl, 4-ethoxy-3-chloro-phenyl, 3-trifluoromethyl-phenyl, 4-methylmercapto-phenyl, naphthyl isocyanate, and the like.

The sulfenic acid chlorides to be used are also known As examples there may be mentioned: sulfur dichloride, disulfur dichloride, methyl-sulfenylchloride, perchloromethylmercaptan, fluoro-dichloro-methyl-sulfenylchloride, phenyl-sulfenylchloride, 4-chlorophenyl-sulfenylchloride, 4-tolylsulfenylchloride, 2-nitrophenyl-sulfenylchloride, and the like.

The reaction is expediently, though optionally, carried out in the presence of an organic solvent.

As solvents (which term includes a mere diluent) which may optionally be used in accordance with the process of the present invention, all inert organic solvents and mixtures thereof are suitable. Preferred solvents include hydrocarbons, especially aliphatic and aromatic hydrocarbons and mixtures thereof, such as petroleum ether fractions, benzene, toluenes, and/or xylenes; chlorinated hydrocarbons, especially chlorinated aliphatic and chlorinated aromatic hydrocarbons and mixtures thereof, such as carbon tetrachloride, methylene chloride, 1,1,2,2-tetrachloroethane, chlorobenzene, o-dichlorobenzene and/or α-chloronaphthalene; ethers, especially aliphatic ethers, particularly lower alkyl ethers, such as diethyl ether, cycloaliphatic ethers, such as dioxan; ketones especially aliphatic ketones, particularly lower alkyl ketones, such as methyl-isobutyl ketone; and esters, especially aliphatic ether-aliphatic carboxylic acid esters including lower alkoxy lower alkyl esters of lower alkanoic acids, such as glycolmonomethyl ether acetate, i.e. methylglycol acetate, and glycolmonoethyl ether acetate; mixtures of the foregoing; and the like.

As acid-binding agents, all tertiary organic amines customarily used for this purpose are suitable. These include tertiary aliphatic, aromatic, mixed aliphatic-aromatic, and heterocyclic amines such as trilower alkyl amines, triphenyl amine, mixed lower alkyl and phenyl amines, tribenzyl amine, mixed lower alkyl, phenyl and benzyl amines, 5-membered heterocyclic amines, etc., for example trimethyl amine, triethyl amine, pyridine and dimethylbenzyl amine.

The reaction temperatures can be varied within a fairly wide range. In general, temperatures are substantially between about 0 to 100° C., preferably from about 10 to 40° C.

In the production process according to the present invention equivalent amounts of the reactants may in principle, be used. The same applies to the acid-binding agents. When using sulfur dichloride and disulfur dichloride, however, 2 mols of carbamic acid fluorides are used per mol of such sulfenyl chlorides.

For the reaction, the procedure can be that the two reactants are provided as a mixture, and the acid-binding agent is then added to them. However, it is also possible first to form an adduct from the sulfenic acid chloride and the tertiary amine and to react this intermediate product with the starting monosubstituted carbamic acid fluoride.

The products produced by the instant process can be purified by recrystallization and/or distillation.

The sulfenylated carbamic acid fluorides are used in the main as intermediate products for further organic synthesis. However, the particular new compounds of the present invention themselves also exhibit insecticidal, acaricidal and fungicidal properties.

The substances obtainable by the process of the present invention exhibit strong insecticidal, acaricidal and fungicidal properties with comparatively low toxicity to warm-blooded animals and low phytotoxicity. The insecticidal and acaricidal effect sets in rapidly and is long-lasting. The active compounds produced can therefore be used with good results for the control of mites (Acarina), Diptera, etc. Such active compounds also inhibit fungi which attack plants from the soil.

The active compounds produced according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granules, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose; dispersible liquid diluent carriers, including inert organic solvents, such as aromatic hydrocarbons (e.g. benzene, toluene, xylene, etc.), halogenated especially chlorinated, aromatic hydrocarbons (e.g. chlorobenzenes), paraffins (e.g. petroleum fractions), chlorinated aliphatic hydrocarbons (e.g. methylene chloride, etc.), alcohol (e.g. methanol, ethanol, propanol, butanol, etc.), amines (e.g. ethanolamine, etc.), ethers, etheralcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose; emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

Such active compounds produced according to the instant invention may be employed alone or in the form of mixtures with one another and/or with such solid or liquid dispersible carrier vehicles and/or with other known compatible active agents, especially plant protection agents, such as other acaricides, insecticides, fungicides, herbicides, bactericides, etc., if desired, or in the form of particular dosage preparations for specific application made therefrom, such as solutions, emulsions, suspensions, powders, pastes, and granules which are thus ready for use.

As concerns commercialy marketed preparations, these generally contemplate carrier composition mixtures in which the active compound is present in an amout substantially between about 0.1–95% by weight, and preferably 0.5–90% by weight, of the mixture, whereas carrier composition mixtures suitable for direct application or field application generally contemplate those in which the active compound is present in an amount substantially between about 0.001 and 5%, preferably 0.01 and 0.5%, by weight of the mixture. Thus, the present invention contemplates over-all compositions which comprise mixtures of a dispersible carrier vehicle such as (1) a dispersible carrier solid, or (2) a dispersible carrier liquid, e.g. organic solvent and/or water, preferablwy including a carrier vehicle assistant, e.g. surface-active agent, such as an emulsifying agent and/or a dispersing agent, and an amount of the active compound which is effective for the purpose in question and which is generally between about 0.001 and 95%, and preferably 0.01 and 95%, by weight of the mixture.

Furthermore, the present invention contemplates methods of selectively controlling or combating pests, i.e. insects, acarids and fungi, which comprises applying to at least one of (a) such pets and (b) their habitat, i.e. the locus to be protected, a combative or pesticidal amount, i.e. an insecticidally, acaricidally and/or fungicidally effective amount, of the particular active compound of the invention alone or together with a carrier vehicle as noted above. The instant informulations or compositions are applied in the usual manner, for instance by spraying, atomizing, vaporizing, scattering, dusting, watering, sprinkling, pouring, and the like.

It will be realized, of course, that the concentration of the particular active compound utilized in admixture with the carrier vehicle will depend upon the intended aplication. Therefore, in special cases, it is possible to go above or below the aforementioned concentration ranges.

The insecticidal, acaricidal and fungicidal properties of the particular new compounds produced in accordance with the present invention are illustrated, without limitation, by the following examples.

EXAMPLE 1

Phaedon test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier, and the resulting concentrate is diluted with water to the desired final concentration.

Horse-radish leaves (*Cochlearia armoratia*) are sprayed with the preparation of the given active compound until dripping wet and then infested with mustard beetles (*Phaedon cochleariae*).

After the specified period of time, the degree of destruction is determined as a percentage: 100% means that al the beetles are killed; 0% means that none of the beetles are killed.

The particular active compounds tested, their concentration, the evaluation time and the results obtained can be seen from the following Table 1.

TABLE 1.—PLANT-DAMAGING INSECTS
[Phaedon larvae]

| Active compound | Concentration of active compound in percent | Degree of destruction in percent after 3 days |
| --- | --- | --- |
| (IV₁) Cl—⟨⟩—N(COF)(SCFCl₂) | 0.2 | 100 |
| (V₁) Cl,Cl—⟨⟩—N(COF)(SCFCl₂) | 0.2 | 100 |

EXAMPLE 2

Tetranychus test

Solvent: 3 parts by weight dimethyl formamide
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10-30 cm., are sprayed with the preparation of the given active compound until dripping wet. These bean plants are heavily infested with spider mites (*Tetranychus urticae*) in all stages of development.

After the specified period of time, the effectiveness of the preparation of active compound is determined by counting the dead mites. The degree of destruction thus obtained is expressed as a percentage: 100% means that all the spider mites are killed whereas 0% means that none of the spider mites are killed.

The particular active compounds tested, their concentration, the evaluation time and the results obtained can be seen from the following Table 2.

diameter. The Petri dishes remain at 20° C. for 3 days for incubation.

After this time, the inhibiting action of the active compound on the mycelium growth is determined in categories, taking into account the untreated control. 0 means no mycelium growth, either on the treated substrate or on the inoculum, the symbol-means mycelium strate or on the inoculum, the symbol — means mycelium growth on the inoculum only with no spread to the treated substrate, and the symbol + means mycelium growth from the inoculum onto the treated substrate, similar to the spread to the untreated substrate of the control.

The particular active compounds tested, their concentration, the test fungi and the inhibition effects achieved can be seen from the following Table 3.

TABLE 3.—AGAR PLATE TEST

| Active compound | | Concentration of active compound in the substrate in p.p.m. | Corticium rolfsii | Sclerotinia sclerotiorum | Verticillium alboatrum | Thielaviopsis basicola | Phytophthora cactorum | Fusarium culmorum | Fusarium oxysporum | Fusarium solani f. pisi |
|---|---|---|---|---|---|---|---|---|---|---|
| Untreated | | | + | + | + | + | + | + | + | + |
| (IV$_3$) | Cl—⟨phenyl⟩—N(COF)(SCFCl$_2$) | 100 | 0 | — | 0 | 0 | — | — | 0 | — |
| (V$_3$) | Cl,Cl—⟨phenyl⟩—N(COF)(SCFCl$_2$) | 100 | 0 | — | 0 | 0 | — | — | 0 | + |
| (VI$_1$) | CH$_3$—N(COF)(SCFCl$_2$) | 100 | 0 | 0 | 0 | 0 | 0 | 0 | 0 | 0 |

TABLE 2.—PLANT DAMAGING MITES
[Tetranychus]

| Active compounds | | Concentration of active compounds in percent | Degree of destruction in percent after 48 hours |
|---|---|---|---|
| (IV$_2$) | Cl—⟨phenyl⟩—N(COF)(SCFCl$_2$) | 0.2 | 100 |
| (V$_2$) | Cl,Cl—⟨phenyl⟩—N(COF)(SCFCl$_2$) | 0.2 | 100 |

EXAMPLE 3

Agar plate test

Test for fungitoxic effectiveness and breadth of the activity spectrum.

Solvent: Acetone
Parts by weight: 100

To produce a suitable preparation of the particular active compound, 1 part by weight of such active compound is taken up in the stated amount of solvent.

The preparation of the given active compound is added to potato dextrose agar (which has been liquefied by heating) in such an amount that the desired concentration of active compound is set up therein. After thorough shaking to achieve a uniform dispersion of the active compound, the agar is poured into Petri dishes under sterile conditions. When the mixture of substrate and active compound has solidified, test fungi from pure cultures are inoculated on to it in small discs of 5 mm.

The production process in accordance with the present invention is illustrated, without limitation, by the following further examples.

EXAMPLE 4

(III$_2$) ⟨phenyl⟩—N(COF)(SCFCl$_2$)

27.8 g. N-phenylcarbamic acid fluoride and 34 g. fluorodichloro-methane-sulfenyl chloride are dissolved in 200 ml. toluene, and 21 g. triethyl amine are added dropwise at room temperature. The temperature is allowed to rise to about 30° C. Stirring is effected for a time, suction filtration from the amine salt (27 g.) is effected, the filtrate is concentrated in a vacuum and the residue is distilled. 20 g. of the above compound, i.e. N-fluoro-dichloro-methyl-sulfenyl-N-phenyl-carbamic acid fluoride, are obtained of B.P. 133 to 136° C./12 mm. Hg, M.P. 53-55° C.

In the same manner, the following compounds are obtained.

| | | |
|---|---|---|
| (VII$_1$) | CH$_3$—⟨phenyl⟩—N(COF)(SCFCl$_2$) | B.P. 147 to 150° C./12 mm. Hg. |
| (IV$_4$) | Cl—⟨phenyl⟩—N(COF)(SCFCl$_2$) | B.P. 159 to 160° C./11 mm. Hg. |
| (V$_4$) | Cl,Cl—⟨phenyl⟩—N(COF)(SCFCl$_2$) | B.P. 175 to 177° C./10 mm. Hg. |

EXAMPLE 5

(VI₂) 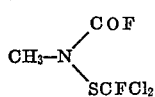

85 g. fluoro-dichloro-methane-sulfenyl chloride are dissolved in 200 ml. ether, and 52 g. triethylamine are added at 10 to 20° C., with ice cooling. 38 g. N-methyl-carbamic acid fluoride are then added dropwise at the same temperature, suction filtration from the amine salt is effected, and the ether is evaporated. The residue is distilled in a vacuum. 53 g. of the above compound, i.e. N-fluoro-dichloro-methyl-sulfenyl-N-methyl-carbamic acid fluoride, of B.P. 57 to 60° C./11 mm. Hg are obtained.

In the same manner, there are obtained:

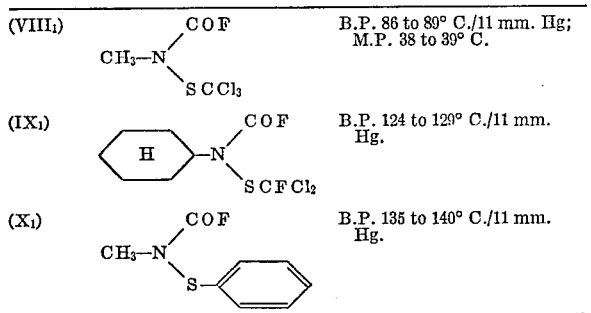

EXAMPLE 6

(XI₁)  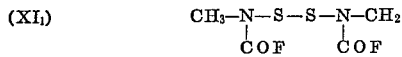

27 g. disulfur dichloride (0.2 mol) in 31 g. N-methyl-carbamic acid fluoride (0.4 mol) are dissolved in 150 ml. toluene and 42 g. triethyl amine are added at 10 to 15° C. Stirring is effected for a time, the triethyl amine hydrochloride formed is filtered off with suction, the filtrate is concentrated in a vacuum and the residue is distilled. By re-distillation there are obtained 7 g. of the above product, i.e. bis-(N-methyl-N-fluorocarbonyl)-amino-disulfide, of B.P. 112 to 114° C./11 mm. Hg.

Using corresponding molar amounts of sulfur dichloride and N-methyl-carbamic acid fluoride, with triethyl amine in toluene, in accordance with the procedure of Example 6, the corresponding bis(-N-methyl-N-fluorocarbonyl)-amino-sulfide is obtained.

Advantageously, in accordance with the present invention, in the foregoing formulae:

$R_1$ represents
 lower alkyl, especially alkyl having 1–4 carbon atoms, such as methyl, ethyl, n- and iso-propyl, n-, iso-, sec.- and tert.-butyl, and the like, particularly methyl;
 cycloalkyl having 5–6 ring carbon atoms, such as cyclopentyl, cyclohexyl, and the like, particularly cyclohexyl;
 phenyl; or
 substituted phenyl which is substituted with lower alkyl as defined above, particularly monomethyl, or 1–3 halo such as chloro, bromo, iodo and/or fluoro, particularly 1–2 chloro groups;

$R_2$ represents
 halo lower alkyl such as chloro, bromo, iodo and/or fluoro substituted methyl, ethyl, n- and iso-propyl, n-, iso-, sec- and tert.-butyl, and the like, especially haloalkyl having 1–4 carbon atoms and 1–3 halo groups, more especially chloro and/or fluoro-$C_{1-4}$ alkyl and particularly trichloro- and fluoro-dichloromethyl;
 phenyl;
 the radical

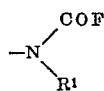

or the radical

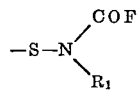

in which the corresponding $R_1$ is the same as defined above for $R_1$ and especially lower alkyl, e.g. $C_{1-4}$ alkyl, particularly methyl, e.g. N-methyl-N-fluoro-carbonyl-amino and -amino-thio.

In accordance with preferred embodiments of the invention:

$R_1$ is lower or $C_{1-4}$ alkyl; $C_{5-6}$ cycloalkyl; mono- or di-chloro-phenyl; and lower or $C_{1-4}$ alkyl-phenyl; and $R_2$ is halo lower or $C_{1-4}$ alkyl, especially with 1–3 and particularly 3 chloro and/or fluoro substituents; phenyl; or the radical

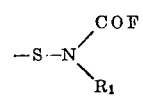

in which $R_1$ is lower or $C_{1-4}$ alkyl.

It will be realized that the starting sulfenic acid chloride according to Formula IIb above contemplates for $R_{2a}$ not only the aforementioned haloalkyl and phenyl radicals but also in effect chloro and chlorothio (i.e. Cl—S—) so as to cover specifically sulfur dichloride Cl—S—Cl (chloro sulfenic acid chloride) and disulfur dichloride Cl—S—S—Cl (chlorothio-sulfenic acid chloride) in which instances twice the quantity of the mono-substituted carbamic acid fluoride will be used to produce the corresponding desired compounds of Formula I having the appropriate radical $R_2$ in accordance with the production process of the present invention.

It will be realized by the artisan that all of the foregoing compounds contemplated by the present invention, i.e. produced by the instant process, possess the desired strong and selective insecticidal, acaricidal and fungicidal properties for combating insects, acarids and fungi, as well as a comparatively low toxicity toward warm-blooded creatures and a concomitantly low phytotoxicity, enabling such compounds to be used with correspondingly favorable compatibility with warm-blooded creatures and plants for more effective control and/or elimination of insects, acarids and fungi by application of such compounds to such pests and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Process for the production of sulfenylated carbamic acid fluorides having the formula

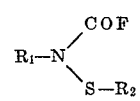

in which $R_1$ is selected from the group consisting of lower alkyl, cycloalkyl having 5–6 ring carbon atoms, phenyl, and substituted phenyl which is substituted with substituents selected from the group consisting of lower alkyl and 1–3 halo, and $R_2$ is selected from the group consisting of halo lower alkyl, phenyl, the radical

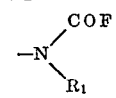

and the radical

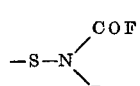

in which last-mentioned instances $R_1$ is the same as defined above, which comprises reacting mono-substituted carbamic acid fluoride having the formula

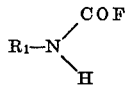

in which $R_1$ is the same as defined above, with a member selected from the group consisting of sulfenic acid chloride having the formula

in which $R_{2a}$ is selected from the group consisting of halo lower alkyl and phenyl, sulfur dichloride and disulfur dichloride, in the presence of a tertiary amine as acid-binding agent, the tertiary amine contacting the mono-substituted carbamic acid fluoride reactant no sooner than the sulfenic acid chloride.

2. Process according to claim 1 wherein said reacting is carried out at a temperature substantially between about 0–100° C.

3. Process according to claim 1 wherein said reacting is carried out in the presence of an inert organic solvent.

4. Process according to claim 3 wherein said inert organic solvent is selected from the group consisting of aliphatic hydrocarbons, aromatic hydrocarbons, chlorinated aliphatic hydrocarbons, chlorinated aromatic hydrocarbons, aliphatic ethers, cycloaliphatic ethers, aliphatic ketones, aliphatic ether-aliphatic carboxylic acid esters, and mixtures thereof.

5. Process according to claim 1 wherein said tertiary amine is selected from the group consisting of tertiary aliphatic, aromatic, mixed aliphatic-aromatic, and heterocyclic amines.

6. Process according to claim 1 wherein said reacting is carried out with about one mol of said mono-substituted carbamic acid fluoride per mol of said sulfenic acid chloride.

7. Process according to claim 1 wherein said reacting is carried out with at least two mols of said mono-substituted carbamic acid fluoride per mol of the member selected from the group consisting of sulfur dichloride and disulfur dichloride.

8. Process according to claim 1 wherein $R_1$ is selected from the group consisting of $C_{1-4}$ alkyl, $C_{5-6}$ cycloalkyl, mono- and di-chloro-phenyl and $C_{1-4}$ alkyl-phenyl, and $R_{2a}$ is selected from the group consisting of trichloro-$C_{1-4}$ alkyl, monofluoro-dichloro-$C_{1-4}$ alkyl, phenyl, and

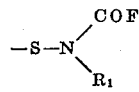

in which $R_1$ in the last-mentioned instance is $C_{1-4}$ alkyl.

9. Process according to claim 1 wherein $R_1$ is selected from the group consisting of methyl, cyclohexyl, monochlorophenyl, dichlorophenyl and methylphenyl, and $R_{2a}$ is selected from the group consisting of trichloromethyl, fluoro-dichloromethyl, phenyl and N-methyl-N-fluorocarbonyl-amino-thio.

10. Process according to claim 1 wherein the sulfenic acid chloride member and tertiary amine are used in the form of an adduct and such adduct is reacted with said mono-substituted carbamic acid fluoride.

11. Sulfenylated carbamic acid fluoride having the formula

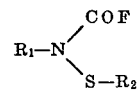

in which $R_1$ is selected from the group consisting of lower alkyl, cycloalkyl having 5–6 ring carbon atoms, phenyl, and substituted phenyl which is substituted with substituents selected from the group consisting of lower alkyl and 1–3 halo, and $R_2$ is selected from the group consisting of halo lower alkyl, phenyl, the radical

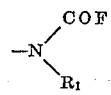

and the radical

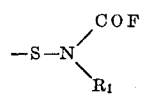

in which last-mentioned instances $R_1$ is the same as defined above.

12. Compound according to claim 11 wherein $R_1$ is selected from the group consisting of $C_{1-4}$ alkyl, $C_{5-6}$ cycloalkyl, mono- and di-chloro-phenyl and $C_{1-4}$ alkyl-phenyl, and $R_2$ is selected from the group consisting of trichloro-$C_{1-4}$ alkyl, monofluoro-dichloro-$C_{1-4}$ alkyl, phenyl, and

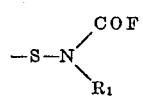

in which $R_1$ in the last-mentioned instance is $C_{1-4}$ alkyl.

13. Compound according to claim 11 wherein $R_1$ is selected from the group consisting of methyl, cyclohexyl, monochlorophenyl, dichlorophenyl and methylphenyl, and $R_2$ is selected from the group consisting of trichloromethyl, fluoro-dichloromethyl, phenyl and N-methyl-N-fluorocarbonyl-amino-thio.

14. Compound according to claim 11 wherein such compound is N-phenyl-N-fluoro-dichloro-methyl-sulfenyl-carbamic acid fluoride having the formula

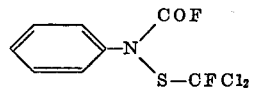

15. Compound according to claim 11 wherein such compound is N-3,4-dichloro-phenyl-N-fluoro-dichloro-methyl-sulfenyl-carbamic acid fluoride having the formula

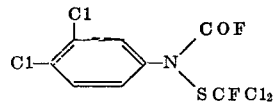

16. Compound according to claim 11 wherein such compound is N-methyl-N-fluoro-dichloro-methyl-sulfenyl-carbamic acid fluoride having the formula

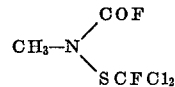

17. Compound according to claim 11 wherein such compound is N-methyl-N-trichloro-methyl-sulfenyl-carbamic acid fluoride having the formula

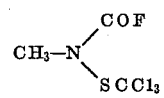

18. Compound according to claim 11 wherein such compound is N-cyclohexyl-N-fluoro-dichloro-methyl-sulfenyl-carbamic acid fluoride having the formula

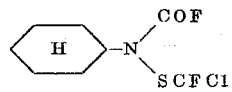

19. Compound according to claim 11 wherein such compound is N-methyl-N-phenyl-sulfenyl-carbamic acid fluoride having the formula

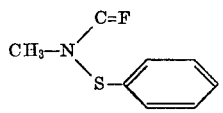

20. Compound according to claim 11 wherein such compound is bis-[(N-methyl-N-fluorocarbonyl)-amino]-disulfide having the formula

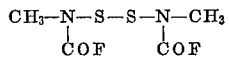

References Cited

UNITED STATES PATENTS 3,499,030   3/1970   Kuhle _____ 260—551

FOREIGN PATENTS 301,285   9/1965   Netherlands _____ 260—543 H

OTHER REFERENCES

Reid: Organic Chemistry of Bivalent Sulfur, vol. 1 pp. 279–281.

LEWIS GOTTS, Primary Examiner

E. J. GLEIMAN, Assistant Examiner

U.S. Cl. X.R.

260—453 A; 424—319